Jan. 17, 1950   F. A. GRUETJEN   2,494,756
BALANCE ASSEMBLY FOR PROPELLER BLADES
Filed March 26, 1945   2 Sheets-Sheet 1

INVENTOR.
Frederick A. Gruetjen
BY
Attorney

INVENTOR.
Frederick A. Gruetjen
BY
Attorney

Patented Jan. 17, 1950

2,494,756

UNITED STATES PATENT OFFICE 2,494,756

BALANCE ASSEMBLY FOR PROPELLER BLADES

Frederick A. Gruetjen, Milwaukee, Wis., assignor to A. O. Smith Corporation, Milwaukee, Wis., a corporation of New York Application March 26, 1945, Serial No. 584,839

2 Claims. (Cl. 170—159)

This invention relates to a balance assembly for a propeller blade and more particularly to a balance assembly that is employed, after a blade has been initially balanced to within certain tolerance limits, to obtain substantially perfect balance of the blade within the tolerance limits initially established.

The principal object of the invention is to provide a balance assembly inside a propeller blade to balance the blade on both its horizontal and vertical axes.

Another object is to provide a balance assembly for a propeller blade that is inexpensive and easily assembled in the blade.

A further object is to provide a balance assembly for a propeller blade in which the same weight may be employed to obtain vertical and horizontal balance.

Another object is to provide a balance assembly in which the weights can be changed within the blade without removing the entire assembly therefrom.

The invention in general is carried out by first determining the overweight unbalance of a propeller blade on its vertical axis and then disposing the necessary component cam-shaped weights at the proper angular position on a longitudinally serrated post secured within a balance cup provided in the root end of the blade to correct the determined vertical unbalance of the blade. Thereafter the blade is balanced against a master blade or standard blade weight to determine horizontal balance. Circular weights may be added to obtain horizontal balance if the cam weights in vertical balancing of the blade have not already established horizontal balance thereof.

Further objects and advantages of the invention appear hereinafter in connection with the description of an embodiment of the invention illustrated in the accompanying drawing.

Figure 1:
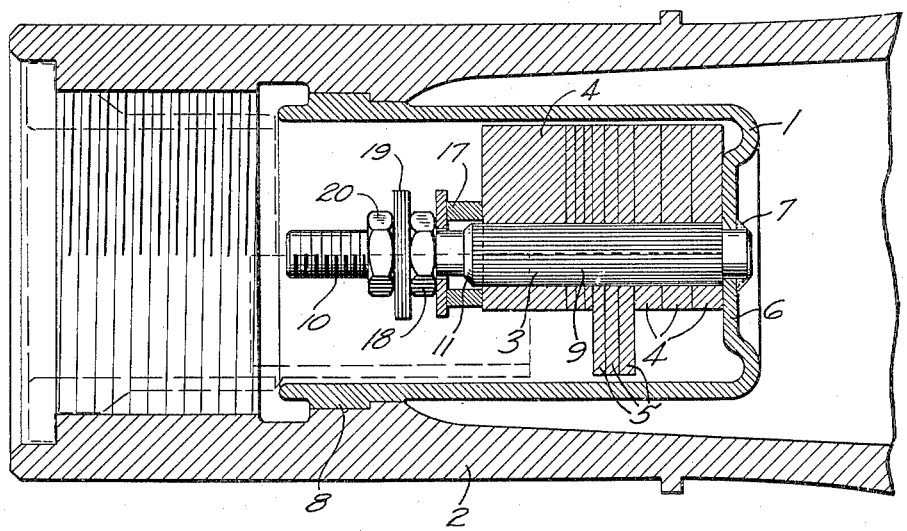
Figure 1 is a longitudinal sectional view of a balance assembly located in the root of a propeller blade with cams, a spacer and washers assembled on the post of the assembly and showing the assembly jig in dotted lines.

The propeller blade balance assembly of the invention in general comprises the cup 1 secured in the root end of propeller blade 2 and having a central longitudinal post 3 inside thereof disposed to receive cam weights 4 and washer weights 5 to obtain vertical and horizontal balance of the blade within defined tolerance limits which have not been overcome in the fabrication of the blade.

Cup member 1 has a generally cylindrical shape and is formed open at the outer end, and with a closure 6 at the inner end having a central opening to receive one end of post 3 which extends through the opening a slight distance and is welded to closure 6 by weld 7 at the outside surface of the closure.

An outer flange 8 is provided adjacent the open inner end of cup 1 for soldering or otherwise securing the cup within the root of blade 2, as illustrated in Figure 1.

Post 3 extends within cup 1 for substantially the length of the inside of the cup and is provided with longitudinal serrations 9 and screw threads 10. Post 3 should be in substantial alignment with the longitudinal centerline of the blade. Serrations 9 extend from the closure end of the post to a shoulder 11 slightly removed from the center toward the free outer end of the post. The screw threads 10 are carried by post 3 for a substantial extent inwardly from the free outer end thereof.

The length of the serrations and screw threads may vary with the amount of vertical and horizontal balancing that is determined to be required to bring the blade to final balance after fabrication.

The longitudinal serrations 9 are preferably equally spaced from each other and their number may vary depending upon the fineness of balance desired. In practice it has been found that satisfactory results can be obtained with thirty-six serrations located approximately ten degrees apart from each other.

The drawings illustrate a balance assembly that is employed to correct an overweight vertical unbalance of a propeller blade up to .7 inch pounds in one direction in either the face or camber foil or the leading or trailing edge. However, if there is unbalance in more than one direction the resultant or the extent or amount of weights required may not exceed the total of .7 inch pounds that is available and the unbalance that can be corrected in one direction is less than that amount. The .7 inch pounds are also available to correct horizontal balance.

The set up of the balance assembly may be changed, if desired, to correct either greater or lesser unbalance than .7 inch pounds.

Figure 2:
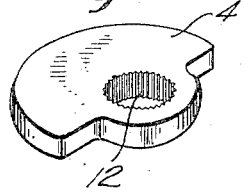
Fig. 2 is a perspective view of a cam weight.
Figure 3:
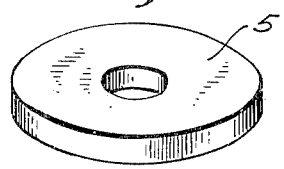
Fig. 3 is a similar view of a circular weight.

The vertical balancing of the invention is obtained by means of cam weights 4 of a size that permits placing them within cup 1. As illustrated in Fig. 2 each cam weight 4 surrounding an aperture through its axial portion carries serrations 12 corresponding to the longitudinal serrations 9 on post 3 for interlocking engagement therewith. The respective cam weights may be of different thickness depending upon the inch pounds or other value given to them. It is preferable to give each cam weight a value that normally will make it readily usable. Figure 1 illustrates cams of different thickness.

The cam weights 4 are ordinarily assembled in one direction on serrated post 3 to correct the determined vertical unbalance. It may be desirable, however, to locate the cams in staggered relation in which event the asembling of the cams will be carried out in a different manner.

Figure 7:
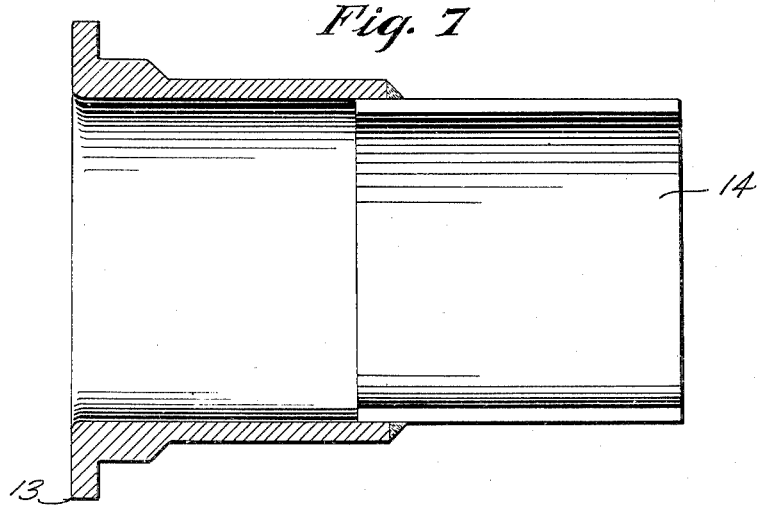
Fig. 7 is a longitudinal sectional view of a fixture employed to place the cam weights on the post of the balance cup.
Figure 8:
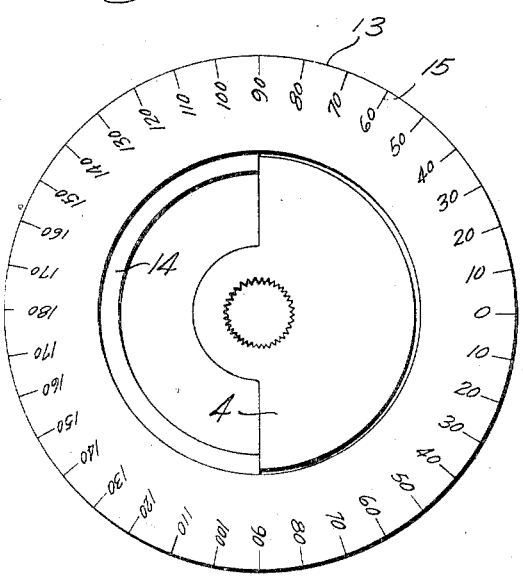
Fig. 8 is an end view of the fixture with a weight assembled therein.

In locating cam weights 4 on post 3, the weights are first assembled, in the same longitudinal radial position, in a fixture or jig comprising a flanged collar 13 and a half sleeve 14 welded inside the smaller end of the collar. Fig. 7 illustrates the jig and Fig. 8 is an end view thereof showing the assembly of a weight therein. The sleeve 14 holds the weights against radial movement when the fixture is properly held.

The face of the flange of collar 13 is provided with scale markings 15 which increase in degrees of 10 from a zero mark, in both a clockwise and a counterclockwise direction until the 180° mark is reached.

The zero mark in scale 15 corresponds to index mark 16 on the outer end of cup 1, of the drawing and the marks located 10 degrees apart correspond to the serrations on the post 3 for each 180° covered by the marks. Index mark 16 represents an index line through the apex of the trailing edge of blade 2 across a radial reference line at station 42 of the blade and cup 1 is secured in blade 2 with mark 16 on the trailing edge line. The balancing of the blade is done at station 42 although other stations on the blade may also be used for the same purpose. Station 42 refers to a transverse reference line across the blade at forty-two inches from the theoretical center of the propeller hub.

After a predetermined number of cam weights 4 constituting a defined mass weight have been assembled in the half sleeve 14 of the jig, the angular mark on the flange of collar 13 representing the angle at which it has been determined the mass of weight should be located to correct a determined unbalance is aligned with index mark 16 of cup 1 and the weights are then slid or transferred onto the post 3. This locates weights 4 in cup 1 at the angular position from index mark 16 at which it has been determined a certain amount of weight should be placed to correct a known overweight unbalance condition in a particular blade. The jig is removed after the weights are in place on post 3.

In the event that the angular position of cam weights 4 does not interlock serrations 12 of the weights with longitudinal serrations 9 on post 3, the weights are turned to interlock with the corresponding serrations on post 3 that dispose the weights nearest the desired angular position. The slight change this may effect in the angular position of the weights has been found to be generally immaterial in balancing the blade within the close tolerance limits defined in the fabrication of the blade.

The interlock between serrations 9 and 12 prevents cam weights 4 from turning. In order to prevent longitudinal movement of the cam weights a spacer sleeve 17 is applied over the exposed portion of the serrations 9 and presses against the weights to hold them in position. Nut 18 is threaded onto screw threads 10 of post 3 securing the assembly in place.

Spacer sleeve 17 may be of different lengths depending upon the number of cam weights 4 that have been utilized to obtain vertical balance. The length of spacer sleeve 17 also depends upon the horizontal balance of blade 2 as will be explained hereinafter.

After the vertical balance of the blade has been determined it is necessary to balance the blade on its horizontal axis which is ordinarily accomplished by balancing the blade against a master blade or standard weight.

The cam weights 4 are taken into consideration in horizontal balancing as well as in the vertical balancing, since adding these weights in cup 1 increases the blade weight. If only a few cam weights are placed on post 3 it may be that these weights plus a spacer sleeve 17 will be sufficient to balance the blade horizontally against a master blade or standard weight.

In the event that this is not sufficient, the washer weights 5 are disposed on post 3 adjacent the cam weights 4 and over the serrations 9. These washers may extend up to shoulder 11 so that only a short spacer 17 may be needed to hold the weights in place or the washers 5 may even extend beyond the shoulder onto screw threads 10. In the latter event spacer sleeve 17 may be eliminated.

Blade 2 has been fabricated within tolerance limits of balance that place the blade in substantially horizontal balance if it is necessary to use all the cam weights to obtain vertical balance. Adding washer weights 5 or sleeve 17 does not effect the vertical balance, if it is necessary to add weights 5 or spacer sleeve 17 even up to the weight carrying capacity of cup 1.

A substantially fine horizontal balance is obtainable by washers 19 and nut 20 if that is desirable. Washers 19 are confined on post 3 between nut 18 and the outer nut 20. It may only be necessary to use the nut 20 to obtain the fine horizontal balance that may be required in which event washers 19 may be eliminated. If horizontal balance has been obtained by cam weights 4, or spacer 17 or washer weights 5 or a combination thereof or even by the weight of cup 1, post 3, and the solder securing cup 1 within blade 2, nut 20 and washers 19 may be entirely eliminated.

After the vertical unbalance of a propeller blade has been determined, the amount of weight and the angular location of the weight of weights may be determined by employing the recognized rules of trigonometry and triangles or by utilizing a suitable calculating device.

Figure 4:
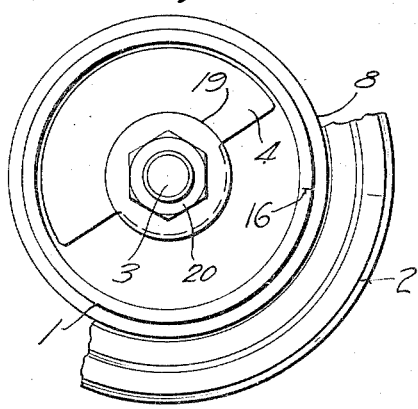
Fig. 4 is a view looking into the cup assembly from the open end with the blade having overweight unbalance of .40 inch pounds in the camber foil and .47 inch pounds in the trailing edge and showing a portion of the blade shank.

Figure 4 illustrates the correction of an unbalance condition of a propeller blade where it has been calculated that to correct an overweight unbalance of .40 inch pounds in the camber foil and .47 inch pounds in the trailing edge, cam weights 4 of the value of .615 inch pounds should be assembled on post 3 with the mass weight thereof at an angular position of 130 degrees counterclockwise from the index mark 16 of cup 1.

To locate the cams 4 on post 3 as disposed in Fig. 4, the cam weights 4 of the total weight of .615 inch pounds are first assembled all in one direction in the half sleeve 14 of the fixture. The cam weights may be of different thickness and in the illustration they equal .615 inch pounds. The 130 degree mark clockwise of the zero of scale 15 on collar 13 of the jig is then aligned with the index mark 16 of cup 1. This locates the mass or center line of the .615 inch pounds of weight counterclockwise of the index mark at which location the cam weights 4 are slid onto the post 3.

Figure 5:
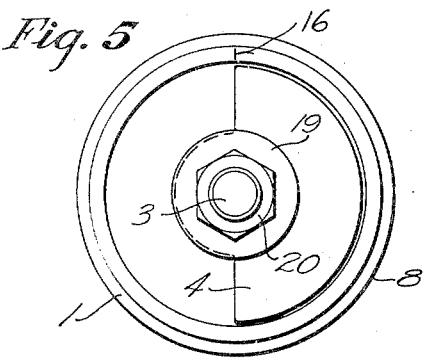
Fig. 5 is a view looking into a cup assembly from the open end with the blade having overweight unbalance of .5 inch pounds in the face foil.

Fig. 5 illustrates the location of the mass weight of cam weights 4 with respect to an index mark 16 where there is an overweight vertical unbalance in the face foil of .5 inch pounds. With an unbalance in only one direction as illustrated here, the mass weight of the cam weights is located 90° clockwise from the index mark 16. The total weight required if the weights are placed all in one direction is the total amount of overweight unbalance of the single portion of the blade. Thus in Fig. 5 the weights 4 have a total inch pound value of .5 inch pounds.

To locate weights 4 in the cup 1 as shown in Fig. 5, the cam weights 4 of a value of .5 inch pounds are assembled in the jig the same as described for Fig. 4. Thereafter the 90° mark counterclockwise from zero on the scale 15 of collar 13 of the jig is aligned with index mark 16. This locates the mass of the weights 4, 90° clockwise from the index mark 16 and on the face foil side of the blade, at which location they are slid onto post 3 to locate them as shown in Fig. 5.

Figure 6:
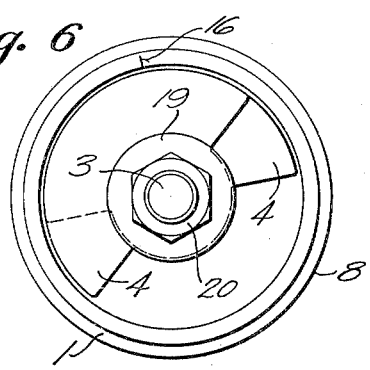
Fig. 6 is an end view of a cup assembly showing cam weights in staggered position to correct a determined unbalance in a propeller blade.

Fig. 6 illustrates the cam weights 4 located in cup 1 in a staggered position to correct a determined unbalance in a propeller blade. When the cam weights 4 are staggered a greater component weight is required for vertical balancing than if the weights were assembled in one direction. This provides additional weight for horizontal balancing.

The jig may also be employed in locating the weights in staggered position. The total cam weights required in one direction are first assembled in the jig and then transferred to the post 3 at the proper determined angular position. The total cam weights required in another direction are thereafter similarly assembled in the jig and then transferred to post 3 at the proper angular position. Fig. 6 illustrates cam weights 4 located in two directions.

The invention provides a simple and inexpensive balance assembly for obtaining a fine balance of a propeller blade on either or both the vertical or horizontal axis of the blade.

Various embodiments of the invention may be employed within the scope of the accompanying claims.

I claim:

1. A balance assembly for a propeller blade, comprising a cup member to be secured within the root of said blade, a post extending inside the cup centrally thereof, a plurality of cam weights radially interlocked to said post at the proper angular position to effect vertical and horizontal balance of the blade, washer weights disposed on said post adjacent said cam weights to effect horizontal balance of the blade, means secured on said post to hold the cam weights and washer weights in place against longitudinal movement and add horizontal weight to the blade to improve the horizontal balance thereof, and a nut and washer secured on the outer end of said post to effect fine horizontal balance after initial horizontal balance has been obtained by the weights originally disposed on said post.

2. A balance assembly for a propeller blade, comprising a cup member to be secured within said blade, a post extending longitudinally centrally of the cup member, said post having a plurality of longitudinal serrations equally spaced from each other, a plurality of cam weights of different weight value with serrations corresponding to those on said post interlocking the same to said post at the correct angular position to balance the blade on the vertical and horizontal axes thereof within given tolerances, and a plurality of washer weights of different value secured on said post to balance the blade on the horizontal axis within closer than said given tolerances without disturbing the previously obtained vertical balance.

FREDERICK A. GRUETJEN.

REFERENCES CITED

The following references are of record in the file of this patent:

UNITED STATES PATENTS

| Number | Name | Date |
|---|---|---|
| 1,645,343 | Moorhouse | Oct. 11, 1927 |
| 1,903,817 | Johnson | Apr. 18, 1933 |
| 2,300,233 | Martin | Oct. 27, 1942 |
| 2,364,111 | Daniels | Dec. 5, 1944 |